United States Patent
Nakagawa

(10) Patent No.: US 7,855,759 B2
(45) Date of Patent: Dec. 21, 2010

(54) ELECTRO-OPTICAL DEVICE AND ELECTRONIC APPARATUS

(75) Inventor: Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/535,008

(22) Filed: Aug. 4, 2009

(65) Prior Publication Data

US 2010/0033645 A1 Feb. 11, 2010

(30) Foreign Application Priority Data

Aug. 5, 2008 (JP) ............................. 2008-202201

(51) Int. Cl.
*G02F 1/1343* (2006.01)
(52) U.S. Cl. .................. 349/39; 349/19; 349/33; 349/38; 349/41; 349/42
(58) Field of Classification Search .............. 349/19, 349/33, 38, 39, 41, 42, 43
See application file for complete search history.

(56) References Cited

U.S. PATENT DOCUMENTS 5,818,550 A * 10/1998 Kadota et al. ................ 349/43
5,844,255 A * 12/1998 Suzuki et al. ................ 257/59
6,226,059 B1 * 5/2001 Yamamoto et al. ........... 349/42

FOREIGN PATENT DOCUMENTS

| JP | 10-039336 | 2/1998 |
| JP | 2004-109974 | 4/2004 |
| JP | 2006-189898 | 7/2006 |

* cited by examiner

*Primary Examiner*—Jennifer Doan
(74) *Attorney, Agent, or Firm*—Workman Nydegger

(57) ABSTRACT

An electro-optical device includes a scanning line, a data line which intersects the scanning line, a pixel electrode which is provided at pixel, and a thin film transistor which has a semiconductor layer having a source area electrically connected to the data line and a drain area electrically connected to the pixel electrode, a relay wiring which is laminated between the semiconductor layer and the pixel electrode and connects the drain area to the pixel electrode, a first shield layer which is laminated between the data line and the relay wiring and is held with predetermined potential, and a second shield layer which is laminated between the pixel electrode and the relay wiring and is held with predetermined potential.

8 Claims, 8 Drawing Sheets

ELECTRO-OPTICAL DEVICE AND ELECTRONIC APPARATUS

BACKGROUND

1. Technical Field

The present invention relates to an electro-optical device such as a liquid crystal device which includes a thin film transistor as a switching element disposed in each of pixels on an element substrate, for example, and an electronic apparatus such as a liquid crystal projector.

2. Related Art

In a liquid crystal device which is an example of the electro-optical device, alignment of an electro-optical material interposed between a pair of substrates is current-controlled by writing an image signal to pixel electrodes in synchronization with an ON/OFF operation of the respective pixel electrodes by TFTs functioning as a switching element. This switching element, a wiring, or the like is formed so as to have a laminated structure on a substrate.

Reduction of black irregularity in an image display unit (that is, improvement in a contrast) or prevention of deterioration in a pixel lifetime was designed by additionally forming a holding capacitor so as to have a laminated structure and adjusting the capacitance value of the holding capacitor in each of the pixels. Specifically, there was suggested a technique for forming a laminated structure in which an existing conductive layer such as a wiring also functions as a capacitor electrode and for effectively forming the holding capacitor while suppressing complexity of the laminated structure caused due to addition of the holding capacitor (see JP-A-10-39336, JP-A-2004-109974, and JP-A-2006-189898).

There is parasitic capacitance or capacitance coupling between a plurality of conductive layers in the laminated structure. Accordingly, in the respective conductive layers as wirings or electrodes, when voltage such as signal voltage or power voltage is applied to the respective conductive layers or when current such as signal current or power current flows, an electronic noise occurs between the plurality of conductive layers. In particular, when an image signal in an image signal line is affected by the electronic noise, the image signal may be distorted and the quality of a display image may thus deteriorate. Therefore, a more serious problem is caused. As a method of reducing the electronic noise, a method of increasing the thickness of an inter-layer insulating film interposed between the plurality of conductive layers can be taken into consideration. However, a basic concept of miniaturization of the electro-optical device may not be realized

SUMMARY

An advantage of some aspects of the invention is that it provides an electro-optical device capable of displaying an image with a high quality by reducing an electronic noise contained in an image signal and an electronic apparatus including the electro-optical device.

According to an aspect of the invention, there is provided an electro-optical device includes: on a substrate, scanning lines which extend in a first direction; data lines which intersect the scanning lines and extend in a second direction; pixel electrodes which are individually provided at pixels in correspondence with intersections of the scanning lines and the data lines; thin film transistors which each have (i) a gate electrode electrically connected to each of the scanning lines and (ii) a semiconductor layer having a source area electrically connected to each of the data lines, a drain area electrically connected to the pixel electrode, and a channel area opposed to the gate electrode with a gate insulating film interposed therebetween; relay wirings which are each laminated between the semiconductor layer and the pixel electrode and connect the drain area to the pixel electrode; first shield layers which are each laminated between the data line and the relay wiring and are held with predetermined potential; and second shield layers which are each laminated between the pixel electrode and the relay wiring and are held with predetermined potential.

In the electro-optical device according to this aspect of the invention, the scanning lines and the data lines are arranged in different directions on the substrate. In addition, the pixel electrode, the thin film transistor (hereinafter, simply referred to as "a TFT"), and the like are provided in each of the pixels in correspondence with the intersections of the scanning lines and the data lines. According to a scanning signal input from the scanning line, the pixel electrodes are turned ON or OFF by the TFTs functioning as a switching element and an image signal is written to the pixel electrodes through the data lines. The pixel electrode is a transparent electrode made of a transparent conductive material such as ITO (Indium Tin Oxide).

According to this aspect of the invention, particularly, the source area and the drain area included in each of the TFTs are electrically connected to the data line and the pixel electrode, respectively. The gate electrode is formed so as to be opposed to the channel area of the semiconductor layer through the gate insulating film.

The relay wiring connecting the drain area of the TFT to the pixel electrode is provided between the layers in which the semiconductor layer and the pixel electrode are formed. The relay wiring is formed in a contact hole of an inter-layer insulating film formed between the semiconductor layer and the pixel electrode, for example, to connect the semiconductor layer and the pixel electrode formed in layers distant from each other. Accordingly, since the potential of the relay wiring is the same as that of the drain area of the semiconductor layer and the pixel electrode, a potential difference occurs among the relay wiring, the data line, and the pixel electrode in another pixel during operation of the electro-optical device. For example, when the TFT is in an OFF state, the potential based on the image signal is applied to the data line, but the relay wiring is maintained to have the same potential as that of the pixel. Moreover, since an image signal is supplied to every pixel in an active matrix type, a potential difference of course occurs between the pixel electrode in another pixel and the relay wiring. In consequence, if this problem with the potential difference is not solved, an electric field caused due to the potential difference occurs between the relay wiring and the data line or a conductive layer such as a pixel electrode in another pixel. That is, the respective potentials act as an electronic noise between the relay wiring and the data line or the pixel electrode in another pixel.

According to this aspect of the invention, however, since the first shield layer is provided between the relay wiring and the data line, the first shield layer is maintained with a predetermined potential (for example, a fixed potential or a potential inversed a uniform period). With such a configuration, since the electric field which is likely to occur on the basis of the potential difference between the data line and the relay wiring can be blocked, image signals in the data line and the relay wiring can be prevented from being mutually affected by the electronic noise. On the other hand, since the second shield layer is provided between the pixel electrode and the relay wiring, the second shield layer is maintained with a predetermined potential (for example, a fixed potential or a potential inversed a uniform period) which is the same as the predetermined potential of the first shield layer or different from the predetermined potential of the first shield layer. With such a configuration, since it is possible to block the electric field which is likely to occur on the basis of the potential difference between another pixel electrode and the relay wiring, image signals in the another pixel electrode and the relay wiring can be prevented from being mutually affected by the electronic noise.

By providing the shield layer between the pixel electrode and the relay wiring and providing the shield layer between the data line and the relay wiring, the electronic noise can be prevented from being mixed with the image signal based on the potential difference. Accordingly, it is possible to improve the quality of a display image.

In the electro-optical device according to this aspect of the invention, the first shield layer may have an area overlapping with the data line and the relay wiring in plan view of the substrate.

With such a configuration, the first shield layer has a plane shape covering the thin film transistor in plan view of the substrate and is disposed in parallel with the substrate, for example. In particular, the first shield layer is laminated between the data line and the relay wiring and has the area which at least partially overlaps with the relay wiring in plan view of the substrate. Since the electric field occurring due to the potential difference between the data line and the relay wiring has a main component in a direction perpendicular to the substrate, the electric field can be effectively blocked by arranging the first shield layer in this manner. Moreover, the electric field cannot be blocked in an area other than the area occupied by the first shield layer. However, when the electric field is partially blocked by the first shield layer, the electric field can be blocked to a great extent.

In the electro-optical device according to this aspect of the invention, the second shield layer may have an area overlapping with the pixel electrode and the relay wiring in plan view of the substrate.

With such a configuration, the second shield layer has a plane shape covering the thin film transistor in plan view of the substrate and is disposed in parallel with the substrate, for example. In particular, the second shield layer is laminated between the pixel electrode and the relay wiring and has the area which at least partially overlaps with the relay wiring in plan view of the substrate. Since the electric field occurring due to the potential difference between the pixel electrode and the relay wiring has the main component in the direction perpendicular to the substrate, the electric field can be effectively blocked by arranging the second shield layer in this manner. Moreover, the electric field cannot be blocked in an area other than the area occupied by the second shield layer. However, when the electric field is partially blocked by the second shield layer, the electric field can be blocked to a great extent.

In the electro-optical device according to this aspect of the invention, the width of the first shield layer may be larger than the width of the relay wiring in plan view of the substrate.

With such a configuration, since the first shield layer is formed broader than the relay wiring, a component perpendicular to the substrate in the electric field which is likely to occur between the data line and the relay wiring can be completely blocked. A component other than the component perpendicular to the substrate, that is, a component detouring around the outside of the end of the first shield layer partially remains. However, the minute component remains, compared to the whole magnitude of electric field. Accordingly, with such a configuration, it is possible to suppress most of the electronic noise caused due to the electric field based on the potential difference between the data line and the relay wiring.

In the electro-optical device according to this aspect of the invention, the width of the second shield layer may be larger than the width of the relay wiring in plan view of the substrate.

With such a configuration, since the second shield layer is formed broader than the relay wiring, a component perpendicular to the substrate in the electric field which is likely to occur between the pixel electrode and the relay wiring can be completely blocked. A component other than the component perpendicular to the substrate, that is, a component detouring around the outside of the end of the second shield layer partially remains However, the minute component remains, compared to the whole magnitude of electric field. Accordingly, with such a configuration, it is possible to suppress most of the electronic noise caused due to the electric field based on the potential difference between the pixel electrode and the relay wiring.

The electro-optical device according to this aspect of the invention may further include dielectric films which are each laminated between the first shield layer and the relay wiring. The first shield layer and the relay wiring as a pair of capacitor electrodes interposing the dielectric film form a holding capacitor.

With such a configuration, by using the first shield layer maintained with a predetermined potential or a fixed potential and the relay wiring maintained with the potential of the pixel electrode as the pair of capacitor electrodes, the hold capacitor is additionally provided without making the laminated structure formed on the substrate complex. In this case, the capacitance value of the holding capacitor may be increased or decreased by appropriately adjusting the thickness of the dielectric film formed between the first shield layer and the relay wiring and the areas of the capacitor electrodes opposed to each other.

With such a configuration, since it is not necessary to add conductive layers for additional capacitor electrodes in order to form a holding capacitor, the laminated structure is not complex. In consequence, a manufacture cost of the electro-optical device can be reduced or the entire size of the electro-optical device can be reduced, thereby realizing the electro-optical device with a high precision.

The electro-optical device according to this aspect of the invention may further include dielectric films which are each laminated between the second shield layer and the relay wiring. The second shield layer and the relay wiring as a pair of capacitor electrodes interposing the dielectric film form a holding capacitor.

With such a configuration, by using the second shield layer maintained with a predetermined potential or a fixed potential and the relay wiring maintained with the potential of the pixel electrode as the pair of capacitor electrodes, the hold capacitor is additionally provided without making the laminated structure formed on the substrate complex. In this case, the capacitance value of the holding capacitor may be increased or decreased by appropriately adjusting the thickness of the dielectric film formed between the second shield layer and the relay wiring and the areas of the capacitor electrodes opposed to each other.

With such a configuration, since it is not necessary to add conductive layers for additional capacitor electrodes in order to form a holding capacitor, the laminated structure is not complex. In consequence, a manufacture cost of the electro-optical device can be reduced or the entire size of the electro-optical device can be reduced, thereby realizing the electro-optical device with a high precision.

According to another aspect of the invention, there is provided an electronic apparatus including the above-described electro-optical device (according to the above aspect).

The electronic apparatus according to this aspect of the invention include the above-described electro-optical device Therefore, it is possible to realize various electronic apparatuses capable of displaying an image with a high quality, such as a projection display apparatus, a television, a cellular phone, an electronic pocket book, a word processor, a view finder type or monitor direct vision-type video tape recorder, a workstation, a television phone, a POS terminal, apparatuses with a touch panel. As an example of the electronic apparatus according to the invention, an electrophoretic display device can be realized.

Operations and other advantages of the invention are apparent from exemplary embodiment of the invention described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to the drawings. In addition, in the following embodiments, a TFT active matrix driving type liquid crystal device having a driving circuit therein as an example of an electro-optical device according to the invention will be exemplified.

First Embodiment

Figure 1:
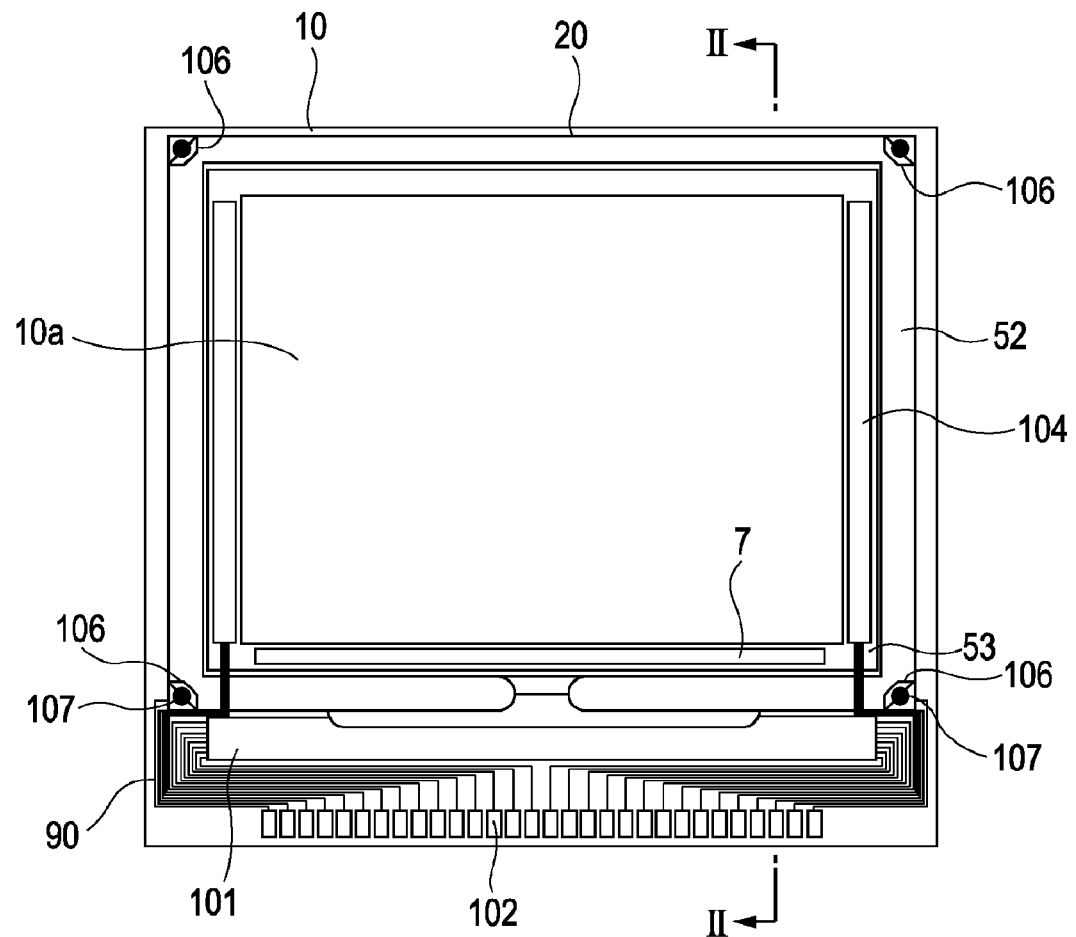
FIG. 1 is a top view illustrating a liquid crystal device according to a first embodiment.
Figure 2:
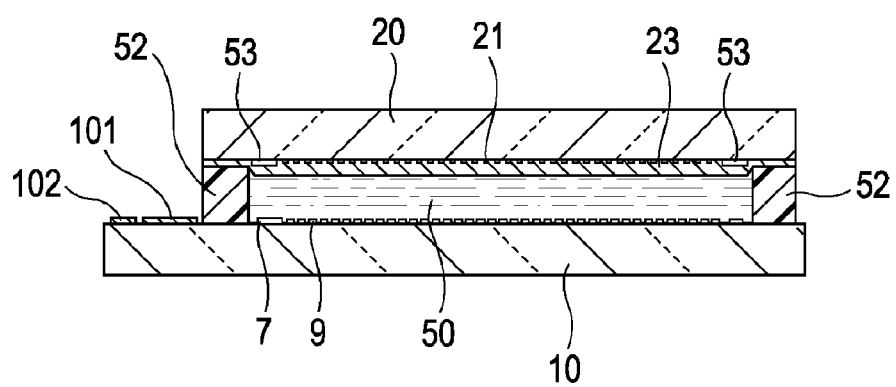
FIG. 2 is a sectional view taken long the line II-II of FIG. 1.

First, the general structure of a liquid crystal device according to this embodiment will be described with reference to FIGS. 1 and 2. Here, FIG. 1 is a top view illustrating the general structure of the liquid crystal device according to this embodiment. FIG. 2 is a sectional view taken along the line II-II of FIG. 1.

In FIGS. 1 and 2, the liquid crystal device according to this embodiment includes a TFT array substrate 10 and a counter substrate 20 opposed to each other. The TFT array substrate 10 is a quartz substrate, a transparent substrate such as a glass substrate, or a silicon substrate, for example. The counter substrate 20 is a quartz substrate or a transparent substrate such as a glass substrate, for example. A liquid crystal layer 50 is sealed between the TFT array substrate 10 and the counter substrate 20. The TFT array substrate 10 and the counter substrate 20 is adhered by a sealing member 52 provided in a sealing area located in the circumference of an image display area 10a where a plurality of pixel electrodes are provided.

The sealing member 52 is made of an ultraviolet curable resin, a thermo-hardening resin, or the like for adhering both the substrates. The sealing member 52 is a member which is hardened by irradiation of ultraviolet rays or heating after the sealing member 52 is applied on the TFT array substrate 10 in a manufacturing process. In the sealing member 52, there are distributed gap substances such as glass fibers or glass beads for allowing an interval (that is, a gap between the substrates) between the TFT array substrate 10 and the counter substrate 20 to be maintained with a predetermined value.

On a side of the counter substrate 20, a frame light-shielding film 53 having a light-shielding property and defining a frame area of an image display area 10a is also provided within the sealing area in which the sealing member 52 is provided. However, a part or the whole of the frame light-shielding film 53 may be provided as a light-shielding film which the TFT array substrate 10 has therein.

In a circumferential area, a data line driving circuit 101 and external circuit terminals 102 are formed along one side of the TFT array substrate 10 in an area located outside the sealing area in which the sealing member 52 is provided. In an area inside the sealing area, a sampling circuit 7 is provided along the one side of the TFT array substrate 10 so as to be covered with the frame light-shielding film 53. Scanning line driving circuits 104 are provided along two sides adjacent to the one side of the TFT array substrate 10, respectively, so as to be covered with the frame light-shielding film 53.

In the TFT array substrate 10, vertical conductive terminals 106 for connecting both the substrates to each other by vertical conductive members 107 are disposed in areas opposed to four corners of the counter substrate 20. With such a configuration, the TFT array substrate 10 and the counter substrate 20 can be electrically connected to each other.

In FIG. 2, a laminated structure provided with wirings such as pixel switching TFTs, the scanning lines, and the data lines is formed on the TFT array substrate 10. In the image display area 10a, pixel electrodes 9 made of a transparent material such as ITO (Indium Tin Oxide) are formed in a matrix shape in the upper layers of the wirings such as the pixel switching TFTs, the scanning lines, and the data lines. An alignment film (not shown in FIG. 2) is formed on the pixel electrode 9. On the other hand, in the counter substrate 20, a black matrix 23 is formed in an area opposed to the TFT array substrate 10. The black matrix 23 is made of a light-shielding metal film, for example, and patterned in a lattice shape or stripe shape, for example, within the image display area 10a on the counter substrate 20. In the light-shielding film 23, counter electrodes 21 made of a transparent material such as ITO are formed on the entire surface (for example, in a solid shape) of the counter substrate 20 so as to be opposed to the plurality of pixel electrodes 9. An alignment film is formed on the counter electrode 21.

With such a configuration, the liquid crystal layer 50 is interposed between the TFT array substrate 10 and the counter substrate 20 in which the pixel electrodes 9 and the counter electrodes 21 are opposed to each other. The liquid crystal layer 50 is formed of liquid crystal in which one or several kinds of nematic liquid crystal are mixed, for example. The liquid crystal layer 50 takes a predetermined alignment state between the pair of alignment films.

The TFT array substrate 10 shown In FIGS. 1 and 2 may be provided with a pre-charge circuit which supplies a pre-charge signal having a predetermined voltage level to the plurality of data lines and the driving circuits such as the data line driving circuit 101 and the scanning line driving circuits 104 before supply of an image signal. Moreover, the TFT array substrate 10 may be provided with an inspection circuit, an inspection pattern, or the like for inspecting a quality, a defect, or the like of the electro-optical device during manufacture or in shipment.

Next, the electric structure of the image display area of the liquid crystal device according to the first embodiment will be described with reference to FIG. 3. Here, FIG. 3 is an equivalent circuit diagram illustrating various elements, wirings, or the like in the plurality of pixels formed in a matrix shape which form the image display area of the liquid crystal device according to the first embodiment.

Figure 3:
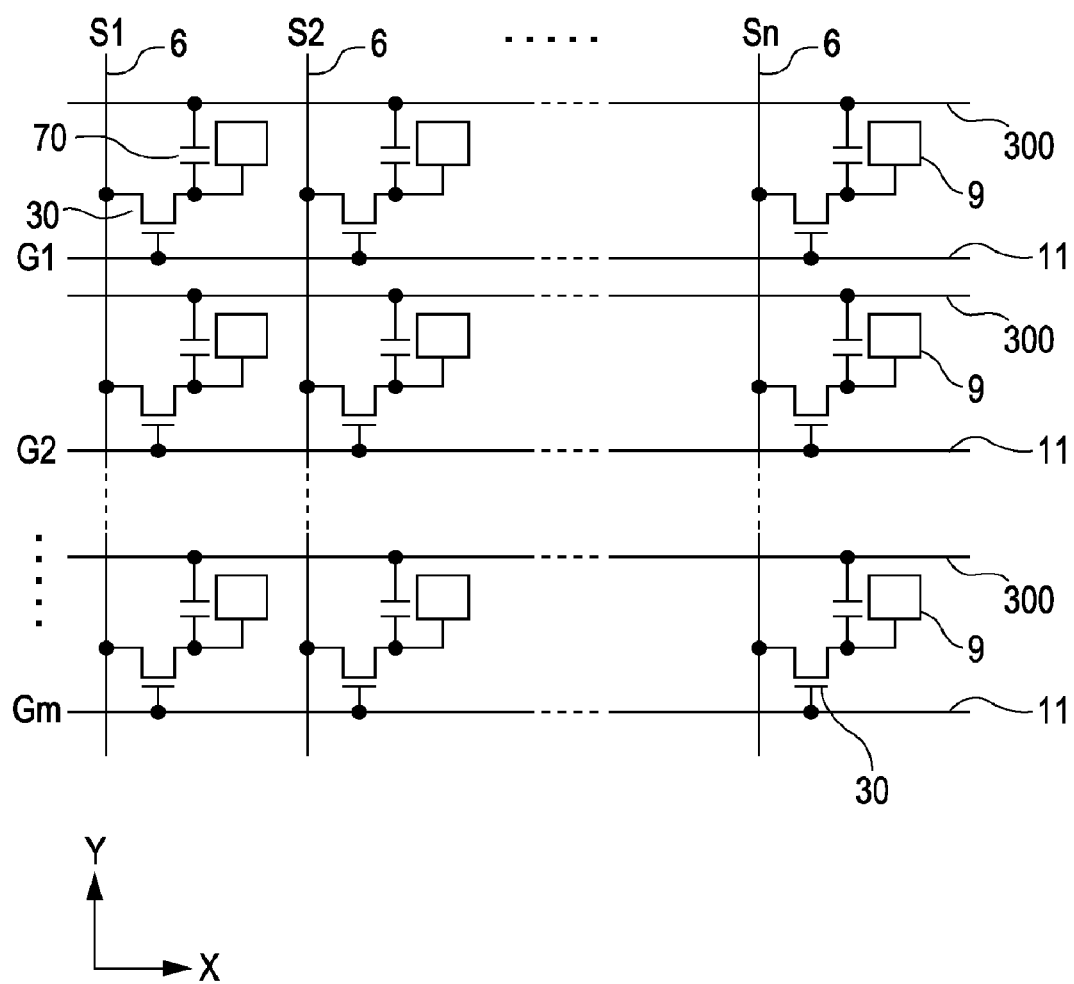
FIG. 3 is a block diagram illustrating the electrical structure of the liquid crystal device according to the first embodiment.

In FIG. 3, each of the plurality of pixels formed in the matrix shape forming the image display area 10a is provided with the pixel electrode 9 and the pixel switching TFT 30 as an example of "a transistor" related with the invention. Since each of the TFTs 30 is electrically connected to each of the pixel electrodes 9, the TFT 30 controls switch of the pixel electrode 9 when the liquid crystal device according to the invention operates. Each of the data lines 6 to which the image signal is supplied is electrically connected to a source area of the TFT 30. Image signals S1, S2, . . . Sn written to the data lines 6 may be supplied sequentially to the data lines 6 in this order of the image signals or may be supplied to the plurality of data lines 6 adjacent to each other in a group unit.

Each of the scanning lines 11 is electrically connected to each of gates of the TFTs 30. In the liquid crystal device according to this embodiment, scanning signals G1, G2, . . . Gm are applied to the scanning lines 11 in this order of the signals in a pulse manner at predetermined timing. Since the pixel electrodes 9 are electrically connected to drains of the TFTs 30, the image signals S1, S2, . . . Sn supplied from the data lines 6 are written at predetermined timing by closing switches of the TFTs 30 as a switching element for certain time. The image signals S1, S2, . . . Sn written to the liquid crystal through the pixel electrodes 9 and having a predetermined level are held between the pixel electrodes 9 and the counter electrodes 21 (see FIG. 2) formed in the counter substrate 20 for certain time (see FIG. 2).

The liquid crystal contained in the liquid crystal layer 50 (see FIG. 2) can make a gray scale display by modulating light due to an variation in alignment or order of molecules caused by a voltage level to be applied. In a normally white mode, transmissivity of incident light is decreased in accordance with a voltage applied in a pixel unit. In a normally black mode, the transmissivity of incident light is increased in accordance with the voltage applied in a pixel unit. Therefore, light having a contrast obtained according to the image signals is output as a whole from the liquid crystal device.

In order to prevent the image signals held in this case from leaking, storage capacitors 70 are additionally formed in electrical parallel with liquid crystal capacitors formed between the pixel electrode 9 and the counter electrodes 21 (see FIG. 2). As described below, the storage capacitors 70 are electrically connected to capacitor lines 300 having a predetermined potential such as a fixed potential or a counter electrode potential inversed a uniform period so that shield electrodes become a predetermined potential Next, a specific structure in the vicinity of the pixel switching TFTs 30 according to the first embodiment will be described with reference to FIGS. 4 to 6.

Figure 4:
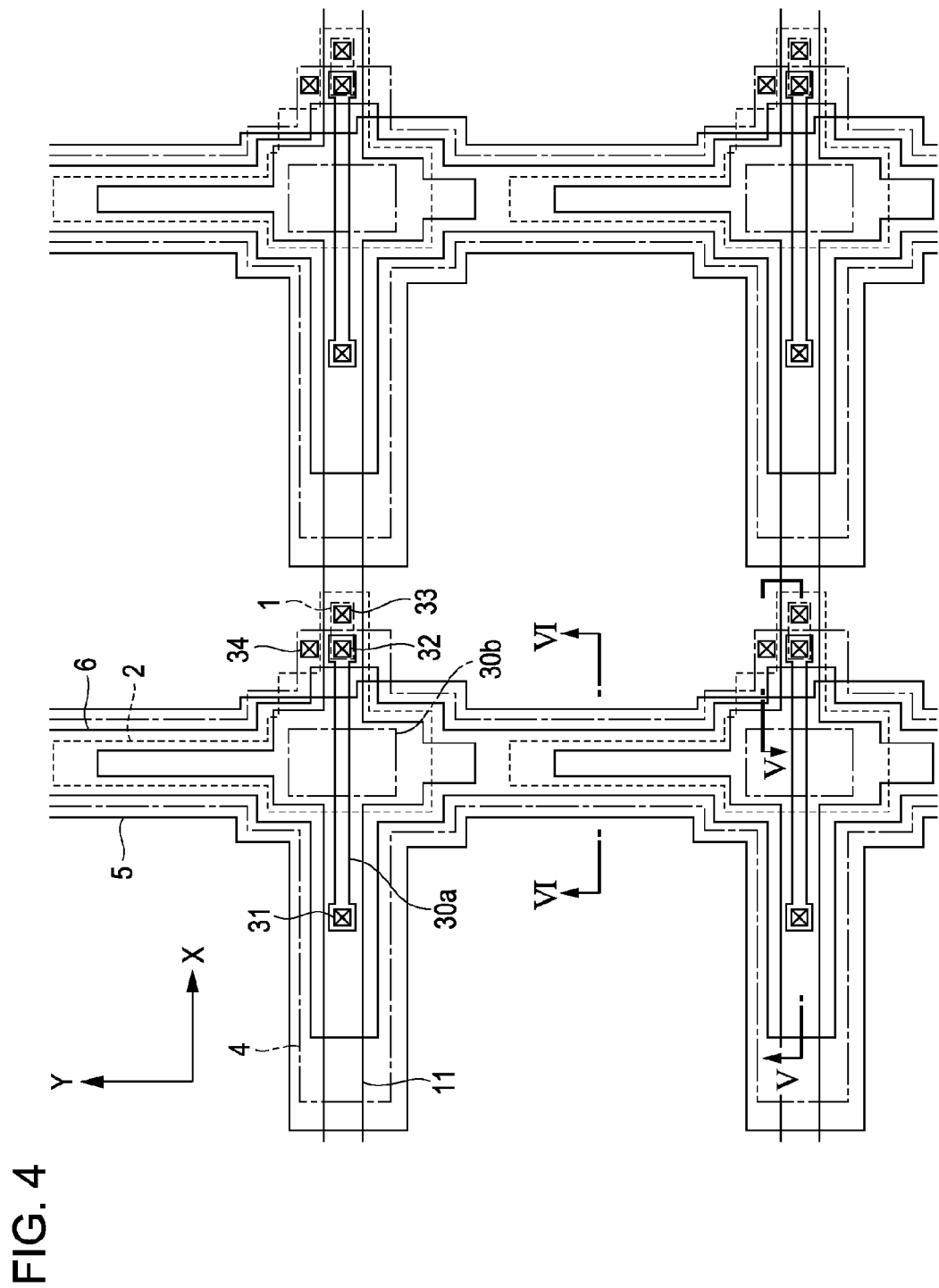
FIG. 4 is a top view illustrating pixel switching TFTs and peripheral wirings formed a TFT array substrate of the liquid crystal device according to the first embodiment.

FIG. 4 is a top view schematically illustrating the configuration of the periphery of the pixel switching TFTs 30 formed on the TFT array substrate 10 of the liquid crystal device according to the first embodiment. In FIG. 4, respective layers and respective elements are expressed in different scales in order to allow the respective layers and the respective elements to be recognizable.

On the TFT array substrate 10, the scanning lines 11 and the data lines 6 extend in an X direction and a Y direction, respectively. In addition, the TFTs 30 (that is, semiconductor layers 30a and gate electrodes 30b) are formed in the vicinities of the intersections of the scanning lines 11 and the data lines 6. The scanning lines 11 are made of a light-shielding conductive material such as W, Ti, or TiN and contain the semiconductor layers 30a of the TFTs 30. As shown in FIG. 4, by forming the scanning line 11 so as to have a width larger than the width of the semiconductor layer 30a of the TFT 30, the gate electrode 30b of the TFT 30 can be almost or completely blocked from light reflected from the rear surface of the TFT array substrate 10 or returned light such as light emitted from another liquid crystal device of a projector having a plurality of plates and passed through a synthetic optical system. In consequence, when the liquid crystal device operates, light leakage current in the TFT 30 can be reduced, thereby improving a contrast ratio. Therefore, it is possible to display an image having a high quality.

The TFTs 30 each include the semiconductor layer 30a and the gate electrode 30b. The semiconductor layer 30a includes a source area 30a1, a channel area 30a2, and a drain area 30a3. An LDD (Lightly-Doped Drain) area may be formed in an interface between the channel area 30a2 and the source area 30a1 or an interface between the channel area 30a2 and the drain area 30a3.

A contact hole 31 electrically connects the source area 30a1 of the TFT 30 to the data line 6. A contact hole 32 electrically connects the drain area 30a3 to a first drain relay wiring 1. A contact hole 33 electrically connects a second drain relay wiring 2 to the pixel electrode 9 (not shown in FIG. 4).

Figure 5:
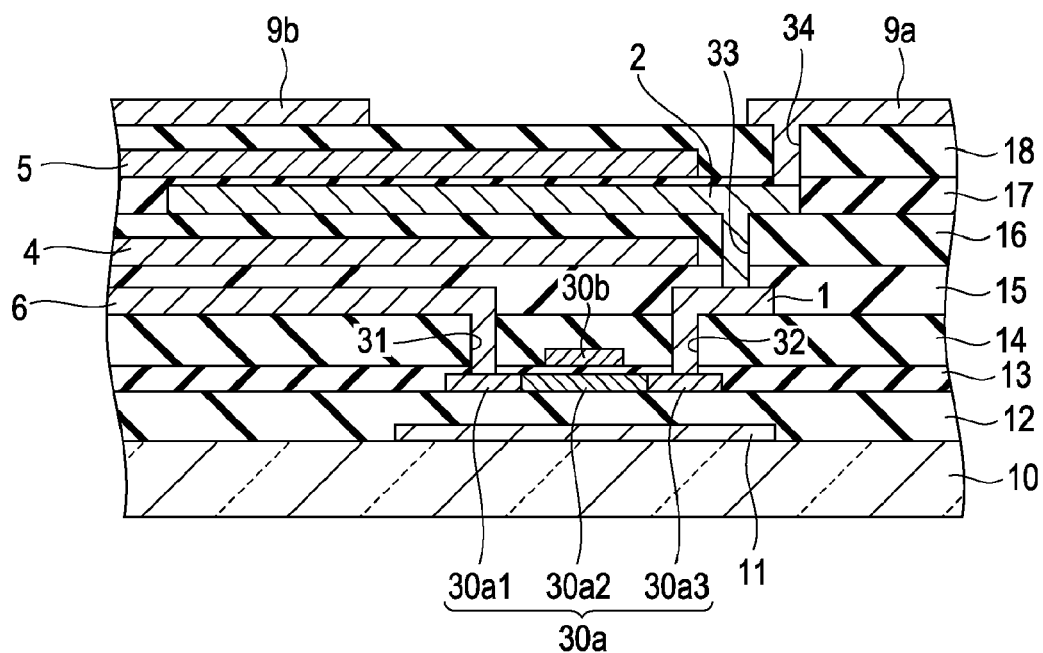
FIG. 5 is a sectional view taken along the line V-V of FIG. 4.
Figure 6:
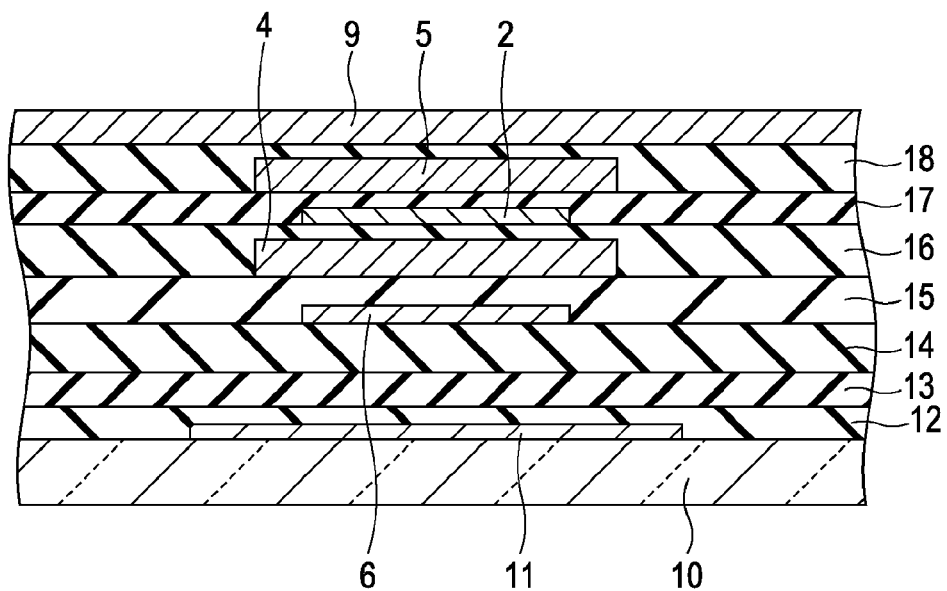
FIG. 6 is a sectional view taken along the line VI-VI of FIG. 4.

Next, the laminated structure in respective positions illustrated in the top view of FIG. 4 will be described in detail with respect to FIGS. 5 and 6.

First, the cross-section of the line V-V of FIG. 4 will be described with reference to FIG. 5. On the TFT array substrate 10, the scanning line 11 is formed so as to have a width larger than the width of the semiconductor layer 30a of the TFT 30. As described above, the scanning line 11 functions as the light-shielding film. Therefore, the scanning line 11 protects the semiconductor layer 30a from light reflected from a lower side of the substrate and returned light. The scanning lines 11 are covered with a ground insulating film 12 of the TFT 30.

The semiconductor layer 30a included in the TFT 30 is formed on the ground insulating film 12. The semiconductor layer 30a includes the source area 30a1, the channel area 30a2, and the drain area 30a3 and forms the TFT 30 together with the gate electrode 30b disposed in an upper layer with a gate insulating film 13 interposed therebetween. The gate electrode 30b is made of conductive poly silicon, for example.

The data line 6 is electrically connected to the source area 30a1 through the contact hole 31 opened in the gate insulating film 13 and an inter-layer insulating film 14. On the other hand, the drain area 30a3 is electrically connected to the pixel electrode 9a formed in the upper layer through the first drain relay wiring 1 and the second drain relay wiring 2. Specifically, the first drain relay wiring 1 is electrically connected to the drain area 30a3 and the second drain relay wiring 2 through the contact hole 32 opened in the gate insulating film 13 and the inter-layer insulating film 14. The second drain relay wiring 2 is electrically connected to the first drain relay wiring 1 and the pixel electrode 9a through the contact hole 33 opened in inter-layer insulating films 15 and 16. The pixel electrode 9a is electrically connected to the second drain relay wiring 2 through the contact hole 34 opened in inter-layer insulating films 17 and 18. With such a configuration, the drain area 30a3 of the TFT 30 is electrically connected to the pixel electrode 9a.

A first shield layer 4 is formed between the second drain relay wiring 2 and the data line 6 and the potential of the first shield layer 4 drops to a common potential (that is, a certain voltage or a rectangular potential inversed at a predetermined period). Accordingly, since an electric field occurring due to a potential difference between the first drain relay wiring 2 and the data line 6 can be blocked by the first shield layer 4, an electronic noise from the data line 6 can be prevented from being mixed with the image signal in the second drain relay wiring 2. For example, when the TFT 30 is in an OFF state, a voltage signal is not output from the drain area 30a3. Therefore, the voltages of the first drain relay wiring 1, the second drain relay wiring 2, and the pixel electrode 9a are maintained constantly. However, since voltages having values varied at time interval corresponding to the image signal are applied to the data line 6a, the potential difference occurs between the second drain relay wiring 2 and the data line 6. Accordingly, if the first shield layer 4 is not formed, an electric field occurs between the data line 6 and the second drain relay wiring 2 on the basis of the dielectric constants of the inter-layer insulating films 13 and 14. In consequence, the electronic noise is mixed with the image signal in the second drain relay wiring 2. In order to solve this problem, as shown in FIG. 5, the first shield layer 4 is provided. Then, by effectively blocking the electric field which is likely to occur between the data line 6 and the second drain relay wiring 2, the electronic noise can be prevented from being mixed with the image signal in the second drain relay wiring 2.

A second shield layer 5 is formed between the second drain relay wiring 2 and the pixel electrode 9 (9a and 9b) and the potential of the second shield layer 5 drops to the common potential (that is, a certain voltage or a rectangular potential inversed at a predetermined period). Accordingly, an electric field which is likely to occur due to a potential difference between the second drain relay wiring 2 and the pixel electrode 9b can be effectively blocked by the second shield layer 5. In addition, by connecting the first shield layer 4 and the second shield layer 5 to a common wiring 300, the potentials thereof are fixed to the common potential (that is, a certain voltage or a rectangular potential inversed at a predetermined period) (see FIG. 3). For example, since a different voltage (that is, the image signal) is supplied to every pixel in an active matrix driving type liquid crystal device, the voltage value of the pixel electrode 9a is generally different from that of the pixel electrode 9b. Since the pixel electrode 9a is electrically connected to the second drain relay wiring 2, the voltage value of the pixel electrode 9a is the same as that of the second drain relay wiring 2. Accordingly, since the voltage value of the pixel electrode 9b is different from that of the second drain relay wiring 2, a potential difference occurs between the pixel electrode 9b and the second drain relay wiring 2. For this reason, if the second shield layer 5 is not provided, an electric field occurs between the pixel electrode 9b and the second drain relay wiring 2 according to the dielectric constants of the inter-layer insulating films 17 and 18. Then, an electronic noise is mixed in the second drain wiring 5 on the basis of the electric field, and thus a display image is distorted. In order to solve this problem, as shown in FIG. 5, the second shield layer 5 is provided. Then, by effectively blocking the electric field which is likely to occur between the pixel electrode 9b and the second drain relay wiring 2, the electronic noise can be prevented from being mixed with the image signal in the second drain relay wiring 2.

By connecting the first shield layer 4 and the second shield layer 5 to the common wiring 300, the potentials thereof are fixed to the common potential (that is, a certain voltage or a rectangular potential inversed at a predetermined period) (see FIG. 3).

Next, the structure in the cross-section of the VI-VI of FIG. 4 will be described with reference to FIG. 6.

The ground insulating film 12, the gate insulating film 13, and the inter-layer insulating film 14 are formed on the TFT array substrate 10. Each of the data lines 6 is arranged on the inter-layer insulating film 14. Each of the data lines 6 is covered with the inter-layer insulating film 15. The first shield layer 4 is formed on the inter-layer insulating film 14 and covered with the inter-layer insulating film 16. The second drain relay wiring 2 is formed on the inter-layer insulating film 16 and covered with the inter-layer insulating film 17. The second shield layer 5 is formed on the inter-layer insulating film 17. The second shield layer 5 is covered with the inter-layer insulating film 18. The pixel electrodes 9 are formed on the inter-layer insulating film 18.

In this embodiment, particularly, the width of the first shield layer 4 is larger than the width of the second drain relay wiring 2 Since the first shield layer 4 has a plane shape in a planar direction parallel with the TFT array substrate 10, an electric field component detouring around the outside of the end of the first shield layer 4 among the electric field occurring between the second drain relay wiring 2 and the data line 6 cannot be completely blocked. However, by forming the first shield layer 4 to be larger than the second drain relay wiring 2, it is possible to effectively reduce the electric field detouring around the outside of the end of the first shield layer 4. Accordingly, by allowing the width of the first shield layer to be sufficiently larger the width of the second drain relay wiring 2, it is possible to allow the first shield layer 4 to block most of the electric field which is likely to occur between the second drain relay wiring 2 and the data line 6. In addition, since the first shield layer 4 has the plane shape, the component detouring around the outside of the end of the first shield layer 4 considerably remains. However, when the width of the first shield layer 4 is sufficiently larger than the width of the second drain relay wiring 2, a problem with the electronic noise caused due to the remaining electric field rarely occurs When the width of the first shield layer 4 is larger than the width of the second drain relay wiring 2 to some extent, the advantages of the invention can be obtained. That is, even when the width of the first shield layer is narrow, the electric field which is likely to occur can be considerably blocked, compared to a case where any shield layer is not provided. Therefore, the electronic noise can be slightly reduced. However, since the larger the width of the first shield layer 4 is, the more an amount of electric field to be blocked is increased, it is preferable that the width of the first shield layer 4 is larger than the width of the second drain relay wiring 2.

In this embodiment, the width of the second shield layer 5 is larger than the width of the second drain relay wiring 2, like the first shield layer 4. Since the electric field which is likely to occur between the pixel electrode 9 and the second drain relay wiring 2 also has a component in a direction parallel to the TFT array substrate 10 as well as the component in direction perpendicular to the TFT array substrate 10, it is preferable that the width of the second shield layer 5 is broad so as to reduce the electric field detouring around the outside of the end of the second shield layer 5.

In this way, the widths of the first shield layer 4 and the second shield layer 5 are sufficiently larger so as to block the electric field which is likely to occur. By forming the first shield layer 4 and the second shield layer 5 in this manner, an image with a high quality can be displayed.

Second Embodiment

Next, a second embodiment will be described with reference to FIGS. 7 to 10. The second embodiment is different from the first embodiment in that each storage capacitor 70 (see FIG. 3) is formed by using a second shield layer 5 and a second drain relay wiring 2 as capacitor electrodes.

Figure 7:
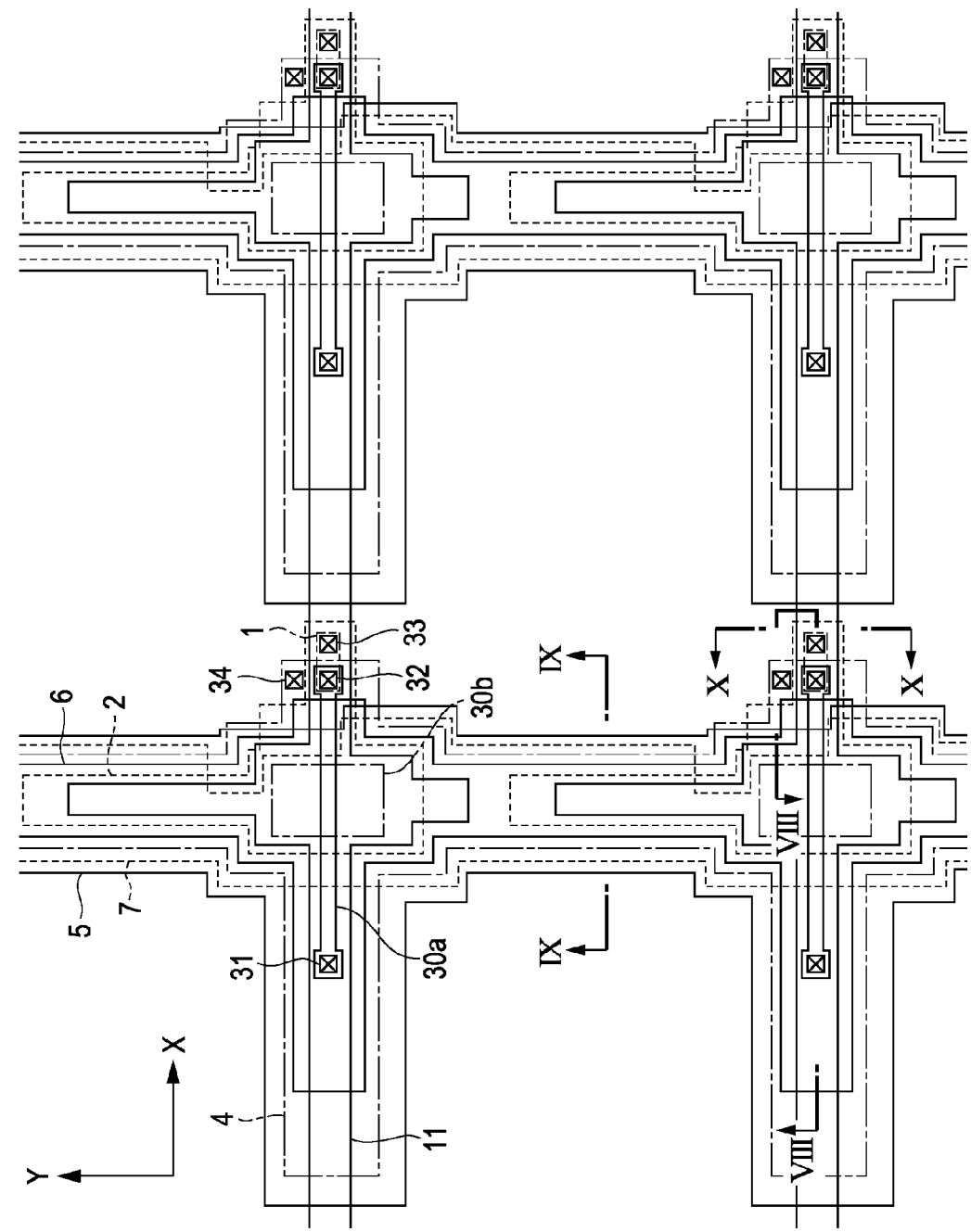
FIG. 7 is a top view illustrating pixel switching TFTs and peripheral wirings formed a TFT array substrate of the liquid crystal device according to a second embodiment.

FIG. 7 is a top view illustrating the peripheral structure of pixel switching TFTs 30 formed on the TFT array substrate 10 of a liquid crystal device according to the second embodiment. In FIG. 7, respective layers and respective elements are expressed in different scales in order to allow the respective layers and the respective elements to be recognizable. A basic structure is the same as that in the first embodiment (see FIG. 4), but a dielectric film 7 is additionally provided between electrodes of each storage capacitor 70 The thickness of the dielectric film 7 and the areas of the capacitor electrodes (that is, the second drain relay wiring 2 and the second shield layer 5) are adjusted according to the capacitance value of the storage capacitor 70 to be added.

Figure 8:
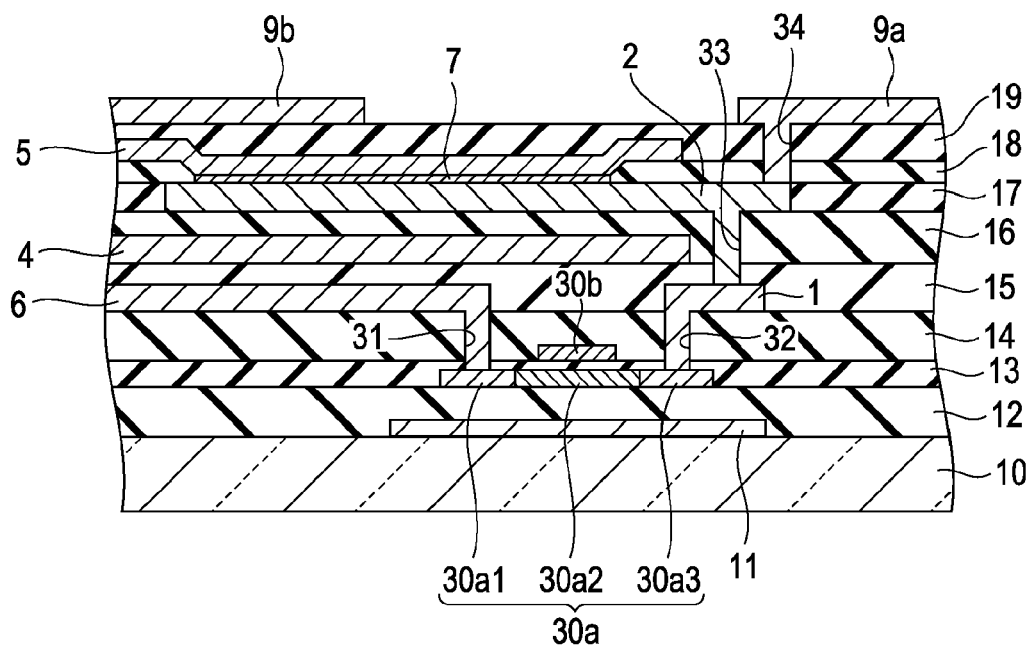
FIG. 8 is a sectional view taken along the line VIII-VIII of FIG. 7.

FIG. 8 is a sectional view taken along the line VIII-VIII of FIG. 7. The thin dielectric film 7 is formed on the second drain relay wiring 2. The second shield layer 5 is formed on an inter-layer insulating film 18 and the dielectric film 7. With such a configuration, the storage capacitor 70 is formed such that the second drain relay wiring 2 and the second shield layer 5 opposed to each other function as a pair of capacitor electrodes. In this embodiment, in order to prevent the second drain relay wiring 2 formed in a lower layer from being damaged at the time of forming the second shield layer 5 by etchings the inter-layer insulating film 18 is formed so as to remain in a portion in which the second drain relay wiring 2 extends in the lower layer, in the pattern contour of the second electrode shield 5 in plan view of the TFT array substrate 10. Moreover, since the capacitance of the storage capacitor 70 is decided depending on the thickness and area of the dielectric film 7, a capacitor insulating film may be formed on the second drain relay wiring according to a desired capacitance value.

Figure 9:
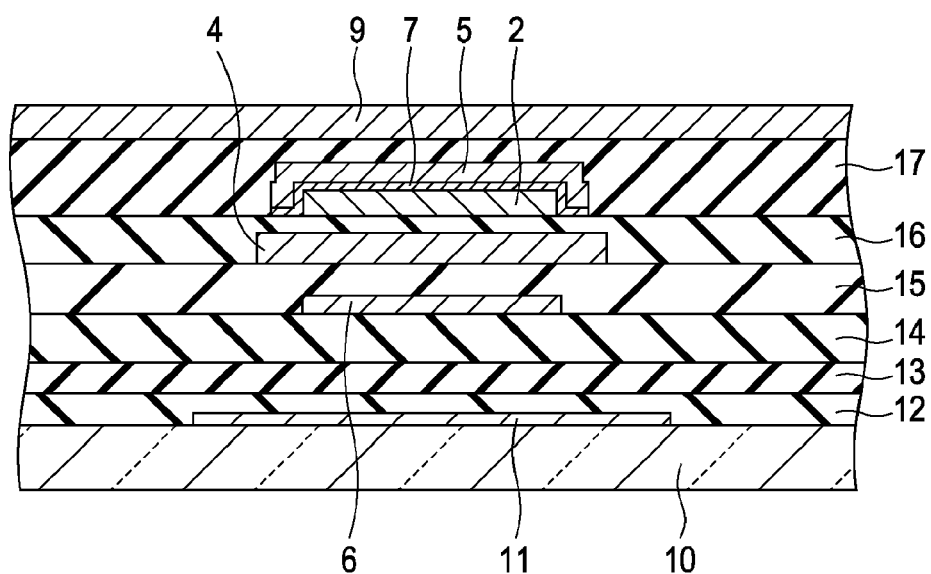
FIG. 9 is a sectional view taken along the line IX-IX of FIG. 7.
Figure 10:
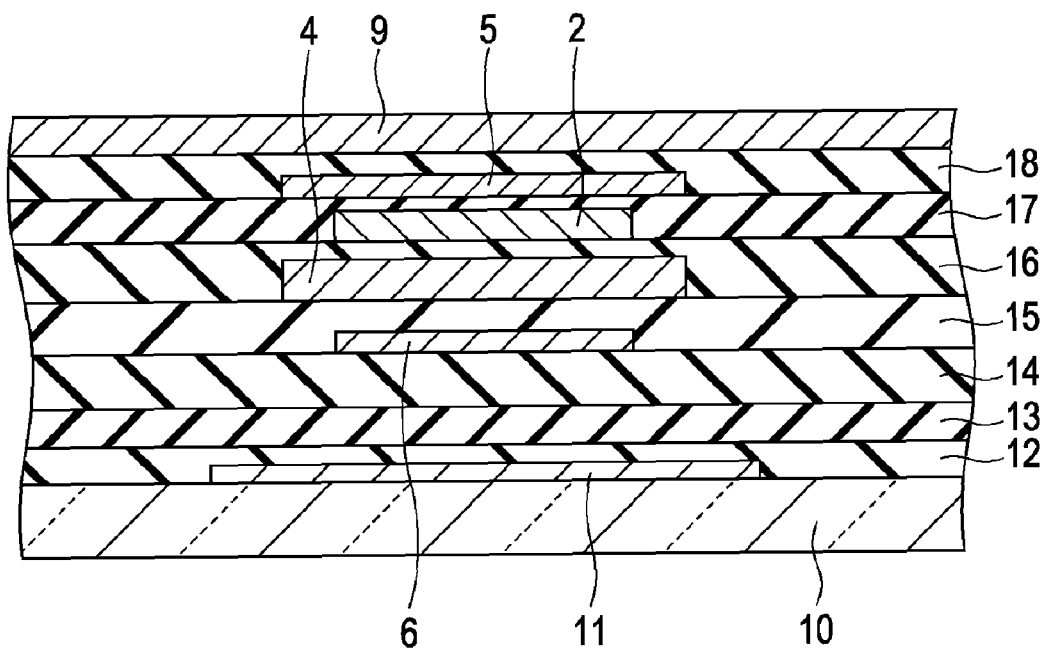
FIG. 10 is a sectional view taken along the line X-X of FIG. 7.

FIG. 9 is a sectional view taken along the line IX-IX of FIG. 7. FIG. 10 is a sectional view taken along the line X-X of FIG. 7. As shown in FIG. 9, the second drain relay wiring 2 is covered with the dielectric film 7 and the dielectric film 7 is covered with the second shield layer 5. In this embodiment, there are provided the storage capacitors in which the second drain relay wiring 2 and the second shield layer 5 also function as the pair of capacitor electrodes. FIG. 10 is the sectional view illustrating an area (an area taken along the line X-X of FIG. 7) where no dielectric film 7 is formed.

In this embodiment, the second shield layer 5 and the second drain relay wiring 2 are used as the capacitor electrodes. A dielectric film may be instead or additionally provided between the first shield layer 4 and the second drain relay wiring 2 so that the first shield layer and the second drain relay wiring 2 function as capacitor electrodes.

By using the second shield layer 5 and the second drain relay wiring 2, the storage capacitor 70 can be added without providing a new conducive layer in the liquid crystal device. Accordingly, since complexity caused due to formation of a new electrode in the laminated structure can be avoided, the TFT array substrate 10 can be manufactured by a simpler manufacturing process. In consequence, an image with a high quality can be displayed and the liquid crystal device can be realized in terms of cost efficient manufacture.

Electronic Apparatus

Next, a projector using an electro-optical device 500 according to the above-described embodiments as a light valve will be described with reference to FIG. 11.

Figure 11:
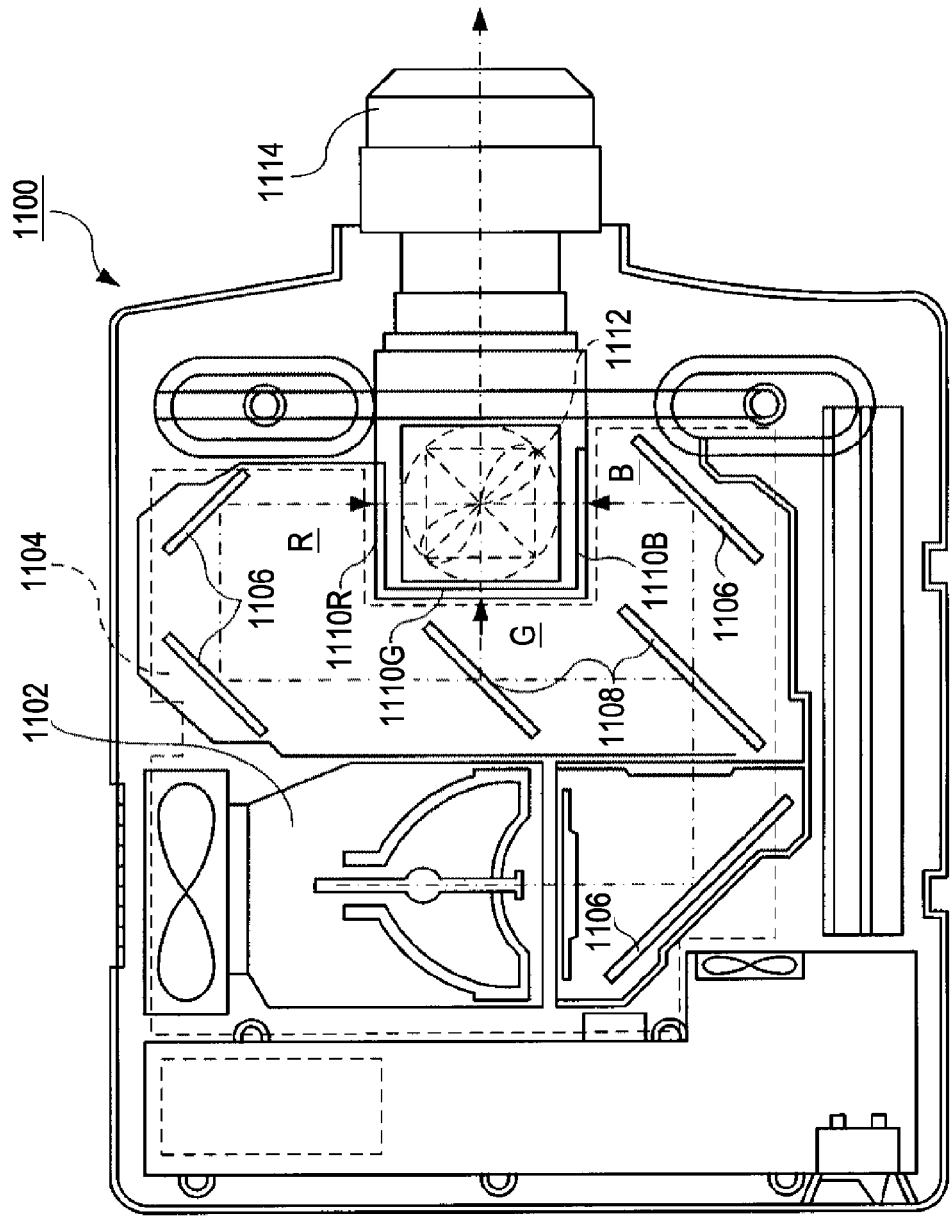
FIG. 11 is a top view illustrating the structure of a projector as an example of an electronic apparatus to which an electro-optical device is applied.

As shown in FIG. 11, a lamp unit 1102 such as a halogen lamp as a white light source is provided inside a projector 1100 Light emitted from the lamp unit 1102 is separated into the three RGB primary colors by four mirrors 1106 and two dichroic mirror 1108 disposed inside a light guide 1104 to be incident on liquid crystal panels 1110R, 1110B, and 1110G as light valves corresponding to the respective primary colors.

The liquid crystal panels 1110R, 1110B, and 1110G each have the same structure as that of the above-described liquid crystal device and are driven by RGB primary color signals supplied from an image signal processing circuit. Light modulated by the liquid crystal panels is incident on dichroic prisms 1112 from three directions. In the dichroic prisms 1112, R light and B light are refracted at 90 degrees, but G light travels straight. Accordingly, images having respective colors are combined, so that a color image is projected on a screen through a projection lens 1114.

Here, as for images displayed by the liquid crystal panels 1110R, 1110B, and 1110G, an image displayed by the liquid crystal panel 1110G is required to be reversed with respect to images displayed by the liquid crystal panels 1110R and 1110B.

Since light corresponding to the respective RGB primary colors is incident on the liquid crystal panels 1110R, 1110B, and 1110G by the dichroic mirrors 1108, respectively, it is not necessary to provided color filters.

In addition to the electronic apparatus described with reference to FIG. 11, the electronic apparatuses include a mobile personal computer, a cellular phone, a liquid crystal TV, a view finder type or monitor direct vision-type video tape recorder, a car navigation apparatus, a pager, an electronic pocket book, a calculators a word processor, a workstation, a television phone, a POS terminal, an apparatus with a touch panel. Moreover, the invention is applicable to these various electronic apparatus.

The invention is applicable to a reflection type liquid crystal device (LCOS), a plasma display (PDP), a field emission display (FED, SED), an organic EL display, a digital micro mirror device (DMD), and an electrophoretic display device, as well as the liquid crystal device described according to the embodiments.

The invention is not limited to the above-described embodiments and may be appropriately modified into various forms without departing the gist of spirit of the invention which can be understood from the appended claims and the whole specification. Therefore, it can be understood that an electro-optical device including such modifications and a substrate for the electro-optical device and an electronic apparatus employing the electro-optical device are included in the technique scope of the invention.

The entire disclosure of Japanese Patent Application No. 2008-202201, filed Aug. 5, 2008 is expressly incorporated by reference herein.

What is claimed is:

1. An electro-optical device comprising:
    a scanning line which extends in a first direction;
    a data line which intersects the scanning line and extends in a second direction;
    a pixel electrode which is provided at pixel in correspondence with intersection of the scanning line and the data line;
    a thin film transistor including:
        a gate electrode electrically connected to each of the scanning line; and
        a semiconductor layer having a source area electrically connected to the data line, a drain area electrically connected to the pixel electrode, and a channel area opposed to the gate electrode with a gate insulating film interposed therebetween;
    a relay wiring which is laminated between the semiconductor layer and the pixel electrode and connects the drain area to the pixel electrode;
    a first shield layer which is laminated between the data line and the relay wiring and is held with predetermined potential; and
    a second shield layer which is laminated between the pixel electrode and the relay wiring and is held with predetermined potential.

2. The electro-optical device according to claim 1, wherein the first shield layer has an area overlapping with the data line and the relay wiring in plan view.

3. The electro-optical device according to claim 1, wherein the second shield layer has an area overlapping with the pixel electrode and the relay wiring in plan view.

4. The electro-optical device according to claim 2, wherein a width of the first shield layer is larger than a width of the relay wiring in plan view.

5. The electro-optical device according to claim 3, wherein a width of the second shield layer is larger than a width of the relay wiring in plan view.

6. The electro-optical device according to claim 1, further comprising:
    a dielectric film which is laminated between the first shield layer and the relay wiring,
    wherein the first shield layer and the relay wiring as a pair of capacitor electrodes interposing the dielectric film form a holding capacitor.

7. The electro-optical device according to claim 1, further comprising:
    dielectric films which are each laminated between the second shield layer and the relay wiring,
    wherein the second shield layer and the relay wiring as a pair of capacitor electrodes interposing the dielectric film form a holding capacitor.

8. An electronic apparatus comprising the electro-optical device according to claim 1.

* * * * *